July 21, 1931.    F. B. TOWNSEND    1,815,125
WIRE HANDLE FOR FRUIT BASKETS
Filed March 17, 1928
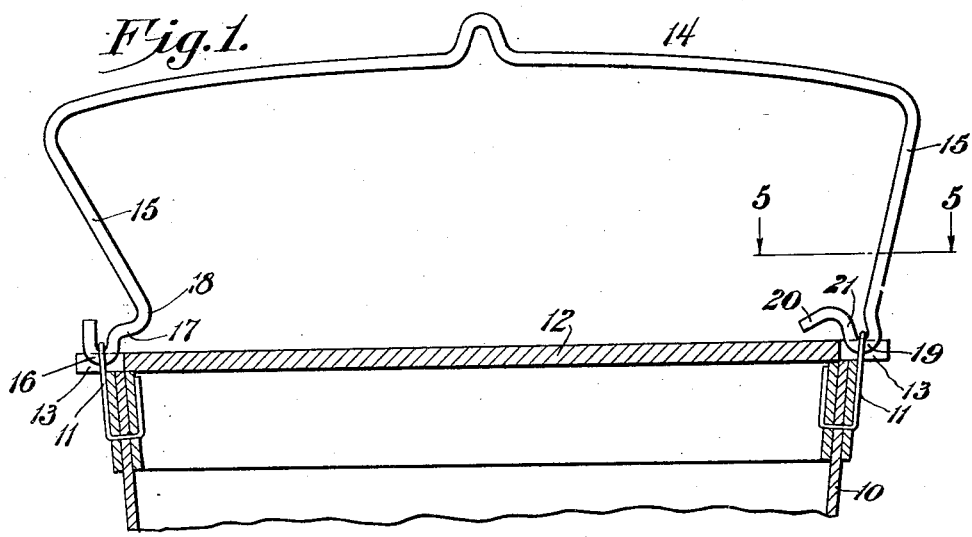
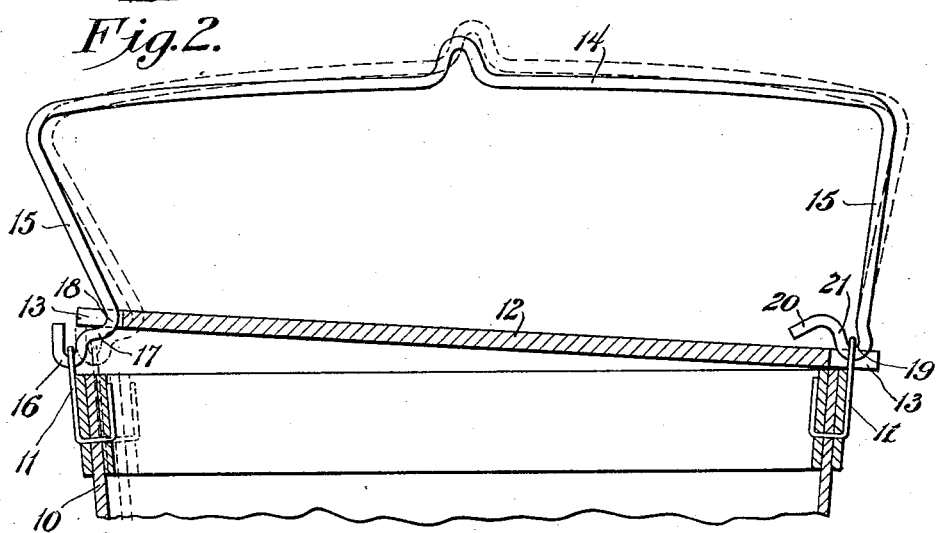
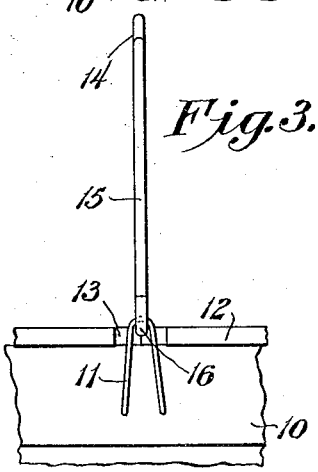
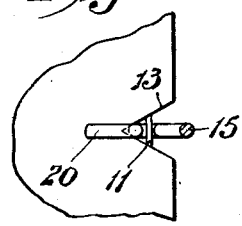
INVENTOR
Frank B. Townsend
BY
Siggers & Adams
ATTORNEYS Patented July 21, 1931

1,815,125

UNITED STATES PATENT OFFICE

FRANK B. TOWNSEND, OF PENN YAN, NEW YORK

WIRE HANDLE FOR FRUIT BASKETS

Application filed March 17, 1928. Serial No. 262,432.

This invention relates to handles for fruit baskets and, among other objects, aims to provide an improved wire handle having hooked ends adapted to be easily inserted in and removed from the usual basket staples or eyes and having provision to hold the basket lid in place. Also it contemplates means whereby the handle may be hinged or swung down flat on the basket lid so that filled baskets may be stacked on top of each other for shipping.

In the accompanying drawings,

Fig. 1 is a fragmentary sectional view of a fruit basket having the preferred form of the handle applied thereto;

Fig. 2 is another view similar to Fig. 1 showing one side of the basket sprung outwardly and the lid being lifted out;

Fig. 3 is a fragmentary side elevation of the basket looking at the left side of Fig. 1;

Fig. 4 is a fragmentary sectional view showing one hook end of the handle being inserted through or removed from its staple; and Fig. 5 is a sectional view taken on the line 5—5 of Fig. 1.

Referring particularly to the drawings the handle there shown is applied to a well known type of basket 10 having staples 11 at the opposite sides and a lid or cover 12 having V-shaped notches 13 on its side edges adjacent to the staple. The arrangement is such that the improved handle hooks hold down the lid so that it cannot be removed without springing one side of the basket outwardly and so that the handle can be swung down to lie practically flat on the lid.

Herein the handle has an arcuate bail portion 14 and inwardly inclined side arms 15 each terminating in a hook adapted to be quickly and easily engaged with or removed from the staples 11 when the lid is off. Referring to Figs. 1 and 2, the left end of the handle is shown as terminating in an open or substantially U-shaped hook 16 adapted to be inserted in the staple from the inside while the other end is held upwardly. That portion of the arm 15 adjacent to the inside leg of the hook is curved inwardly and upwardly as shown at 17 to overlie the edge of the basket lid 12 beyond the bottom of the V-shaped notch, the idea being to allow enough clearance so the handle can be swung down and also to prevent the handle from being sprung accidentally out of engagement with the lid. The bent portion or hump 18 above the inclined shoulder portion 17 is adapted to be pressed outwardly by springing the basket side so that the notched portion of the lid will snap past it as it is about to do in Figure 2.

The other hooked end of the handle is quite different from the one just described. It is so constructed that, after the hook 16 is inserted, it may be pushed in its staple from the outside of the basket. Referring to Figs. 1, 2 and 4, this end of the handle is there shown as having an open hook portion 19 at the lower end of the arm 15, and the inner leg of the hook is extended inwardly and curved downwardly to its end at 20 so that this end overlies the lid beyond the bottom of the V-shaped notch at that side. Also, it has sufficient clearance above the lid to permit swinging movement of the handle when the lid is thus held in place. Moreover, it cannot be pushed out of the staple because the inner curved portion 21 of the hook has to ride down in the staple and this causes the end to grip tightly against the top of the lid. Also, it will be seen that the handle can be put on or removed only when the lid is removed.

From the foregoing description it will be clear that the improved handle can be made very cheaply of bent wire and that it can easily be inserted in the staples after the basket is filled without injuring the fruit. To put the lid on, it is only necessary to slip the right edge (Figs. 1 and 2) under the end 20 of the hook 19 and snap the other side down below the bump 18 so that the shoulder 17 snaps inwardly beyond the bottom of the notch 13 in that side. Moreover, the hooks are then free to swing in the staples or eyes due to the clearance without bending the handles when the filled baskets are stacked.

Obviously, the present invention is not restricted to the particular embodiment thereof herein shown and described.

What is claimed is:—

1. In combination with a fruit basket having a notched lid and handle receiving staples extending above the edges of the basket rim and lying in planes parallel with the sides, a handle having a pair of differently shaped hooked ends, one end inserted through its staple from the inside and the other end inserted through its staple from the outside; and each having a portion overlying the lid, one of the end portions presenting a curved shoulder adapted to snap over the edge of the lid beyond the bottom of one of the notches, said staples extending above the lid, whereby the handle may be swung down to lie flat on the lid.

2. A wire handle for fruit baskets having a substantially U-shaped hook portion at one end to engage a basket staple; a curved inwardly and upwardly inclined shoulder portion adjacent to said hook portion adapted to overlie the basket lid; and a differently shaped hook portion at the other end adapted to be inserted through the basket staple from the outside after the U-shaped hook has been inserted in its staple and having an inwardly and downwardly curved end portion adapted to overlie the top of the basket lid, whereby the handle cannot be disengaged from the lid without removing the lid.

3. A wire handle for fruit baskets comprising a bail portion, a substantially U-shaped hook at one extreme end of the handle to be inserted in the basket staple from the inside; an inwardly and upwardly curved shoulder portion adjacent to the hook adapted to overlie the edge of the basket lid; a hook portion near the other end of the handle having an inwardly and downwardly curved end adapted to be inserted through its staple from the outside of the basket, said extension adapted to overlie the opposite edge of the lid; and both portions overlying the lid having sufficient clearance to permit the handle to swing down and lie flat on the lid and the bent portions being so arranged that the hooks cannot be accidentally disengaged from their basket staples.

In testimony, that I claim the foregoing as my own, I have hereto affixed my signature.

FRANK B. TOWNSEND.